Nov. 20, 1923.

W. COOPER 1,474,406

ANIMAL TRAP

Filed Jan. 3, 1921

INVENTOR
William Cooper
BY
F. N. Gilbert
ATTORNEY

Nov. 20, 1923.　　　　　W. COOPER　　　　　1,474,406
ANIMAL TRAP
Filed Jan. 3, 1921　　　　　2 Sheets-Sheet 2
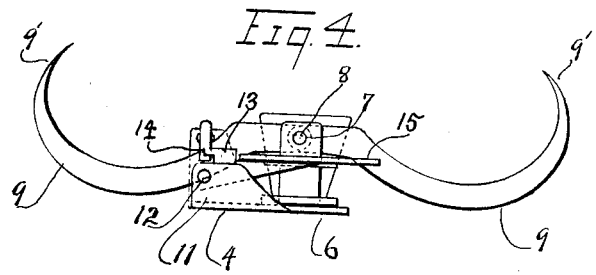
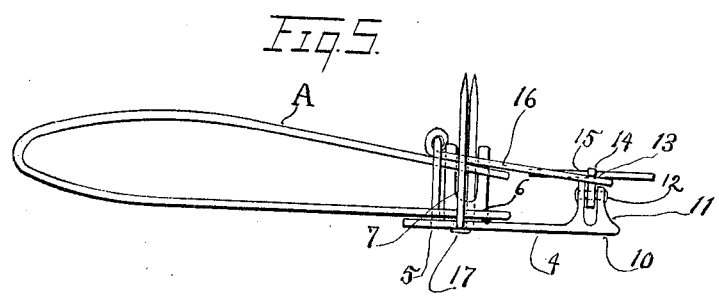
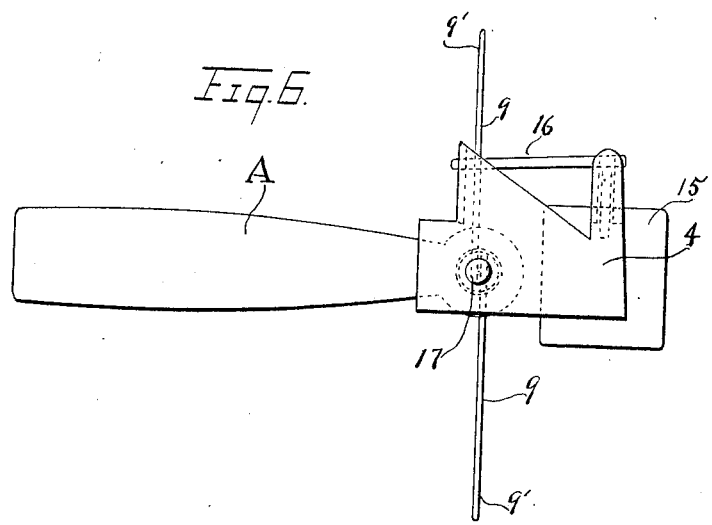
INVENTOR
William Cooper
BY
F. N. Gilbert
ATTORNEY Patented Nov. 20, 1923.

1,474,406

UNITED STATES PATENT OFFICE.

WILLIAM COOPER, OF APALACHIN, NEW YORK.

ANIMAL TRAP.

Application filed January 3, 1921. Serial No. 434,746.

*To all whom it may concern:*

Be it known that I, WILLIAM COOPER, a citizen of the United States, residing at Apalachin, in the county of Tioga and State of New York, have invented certain new and useful Improvements in Animal Traps, of which the following is a specification.

My invention relates to traps for catching game and it has for its object to provide a light easily operated and effective and economically constructed spring trap for catching game. With these objects in view, my invention consists of certain novel features of construction and arrangement of parts as will be hereinafter more clearly shown and pointed out in the claims, reference being had to the accompanying drawings, in which: Fig. 1 is a plan view of my device.

Fig. 4, is a front end view with the trap set.

Fig. 5, is a side view of my device with the trap set.

Fig. 6 is a bottom plan view with the trap set.

Figure 1:
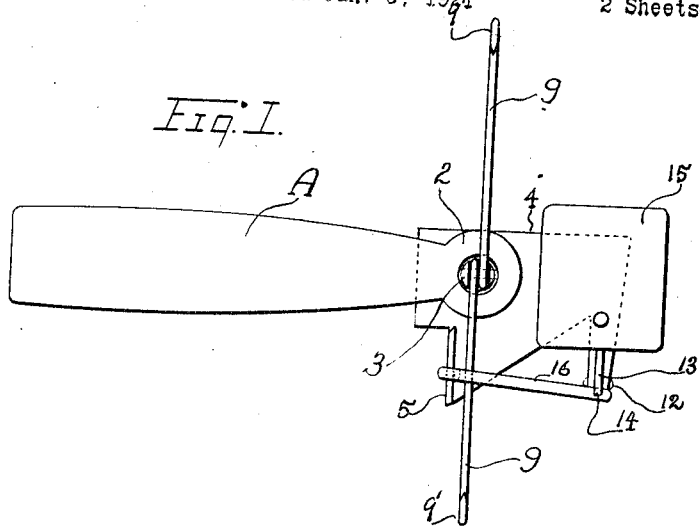
Figure 2:
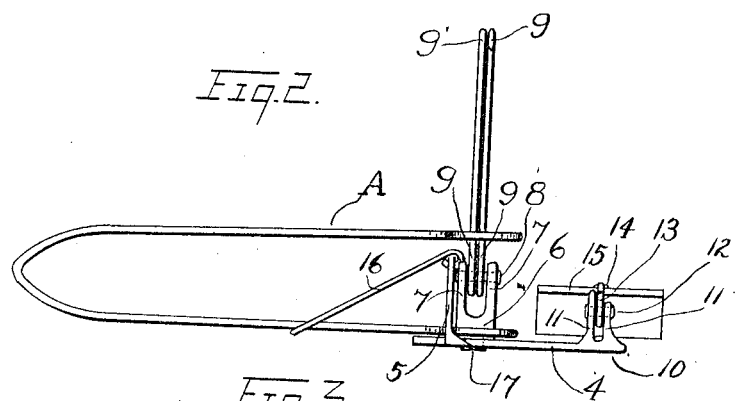
Fig. 2, is a side view of my device.
Figure 3:
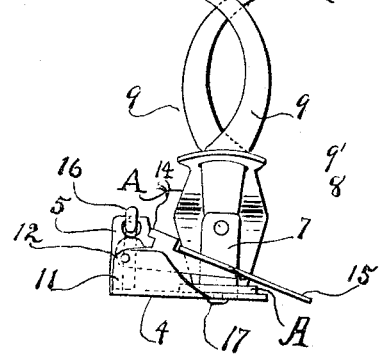
Fig. 3, is a front end view of my device, with the trap sprung.

The same reference characters denote like parts in each of the several figures of the drawings. In the construction of my device I have the main spring A having the circular end projection with opening 3 therein. In further construction of my device I have the base plate 4 in which I have integrally therewith the vertical lug 5; pivotally and vertically mounted in plate 4, I have the slotted lug 6 having the arms 7, 7 and between which arms I have mounted the pin 8, and pivotally mounted on pin 8, I have the jaws 9.9 projecting into the hooked or curved ends, 9′.9′; at the outer end of base plate 4 I have the arm 10 having bent integrally therefrom the projecting parallel lugs 11, 11 and between which I have mounted pin 12, on which pin 12, I have pivotally mounted the arm 13, having therein the notch 14 on the inner end, and supported thereby I have the plate 15. Pivotally mounted thereon I have the trigger arm 16; in construction the base ends 9.9 of the jaws extend through the opening 3 on spring A and when the trap is sprung the upper arm of the spring moving upward raises up and draws together the jaws 9.9 until they assume the vertical position shown in Figs. 2 and 3; the lug 6 supporting this is pivotally mounted on plate 4 by means of the pivot 17; in this construction it is possible to fashion the mechanism or device entirely of plate metal. The base plate 4 can be turned in either direction on pivot 17. In the operation of my device, when I desire to set the trap, I press down together the arms of the spring A, forcing down the ring 2, until it encircles lugs 7.7 as shown in Fig. 1, and the pivoted and then vertical positioned jaws 9.9 drop back into a horizontal position resting upon ring 2 of the compressed spring A; I then drop over the trigger arm 16 until it raises over and presses down upon jaw 9, and catches the end of the trigger 16 into the notch 14 of the lever 13, which supports the trip plate 15; the strain and pressure of the spring A against jaw 9 and the resultant pressure against trigger 16, holds the trigger 16 in contact with notch 14 and thus it holds the plate 15 in a horizontal position ready to be sprung by the game bearing down on the plate 15, releases trigger 16 from notch 14, and the spring A expanding upward, draws upward the horizontal jaws 9.9 with the movement upward of ring 2 until the jaws 9.9 are closed about the game.; the pivoted base plate 4 enables the trip plate 15 to be turned at various angles to the main spring A and thus more easily accommodated itself to the advantages of setting the trap in different positions. When it is desired to trap game, the simple form of combination of the parts enables the trap to be easily concealed from the view of the game as it approaches, and thus presents advantages in use.

Having thus described my invention, what I claim as new and for which I desire Letters Patent is as follows:

1. In an animal trap the combination of a base, a post pivotally secured to the base and provided with two parallel arms, jaw members having their extremities pivotally mounted between the arms of said post, a spring member provided with an opening at its end adapted to move over said post and arms and press upward on the inner ends of said jaws, an integral arm secured to the base, a trigger member pivotally secured to said integral arm, and a trip plate pivotally mounted on the base at the front thereof and provided with a notch adapted to receive the end of the trigger bar.

2. In an animal trap the combination of a vertical post provided with a pair of spaced arms, hook shaped jaw members pivotally mounted between the spaced arms, a base plate having pivotal relation with the vertical post, a bow spring having one end in engagement with the base plate and the other end provided with an opening adapted to move over said post and arms and press upward on the inner ends of said jaws, a trigger bar member pivotally secured to said base at the rear thereof and a trip plate pivotally mounted at the front end thereof and provided with a notch to receive the free end of the trigger bar.

In testimony whereof I have affixed my signature.

WILLIAM COOPER.